UNITED STATES PATENT OFFICE.

AUGUST BLANK, OF LEVERKUSEN, NEAR COLOGNE, GERMANY, ASSIGNOR TO FARBENFABRIKEN VORM. FRIEDR. BAYER & CO., OF ELBERFELD, GERMANY, A CORPORATION OF GERMANY.

AZO DYE.

1,023,120.  Specification of Letters Patent.  Patented Apr. 16, 1912.

No Drawing.  Application filed June 1, 1911. Serial No. 630,647.

*To all whom it may concern:*

Be it known that I, AUGUST BLANK, doctor of philosophy, chemist, citizen of the German Empire, residing at Leverkusen, near Cologne, Germany, have invented new and useful Improvements in New Azo Dyes, of which the following is a specification.

My invention relates to the manufacture and production of new and valuable azo dyestuffs which are obtained by tetrazotizing one molecule of aminobenzene-azo-1-amino-8-naphthol-sulfonic acids and by combining the tetrazo compounds with two molecules of an azo dyestuff component one of which must be resorcin. The new dyes produce after dyeing and developing of the dye on the fiber with suitable diazo compounds, such as meta- or para-nitraniline, valuable olive to brown shades, known technically as bronze and bister brown which are very fast to washing and to light and can be discharged to a pure white.

The new dyes are after being dried and pulverized dark powders having most probably the formula:

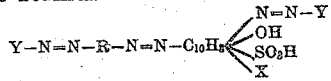

R meaning an aryl, X=H which may be replaced by $SO_3H$, Y=resorcin or a metadiamin one Y must always be resorcin. They yield upon reduction with stannous chlorid and hydrochloric acid a phenylenediamin, a diaminonaphthol sulfonic acid and aminoresorcin.

In order to illustrate the new process more fully the following example is given, the parts being by weight:—150 parts of meta-aminoacetanilid are diazotized with 69 parts of sodium nitrite and hydrochloric acid and the resulting diazo compound is added at 0° C. to a solution of 341 parts of the acid sodium salt of 1.8-amino-naphthol-3.6-disulfonic acid containing 250 parts of sodium carbonate. When the copulation is complete the azo dye is saponified by boiling it with a caustic soda lye containing 350 parts of NaOH until the acetyl group is split off. Subsequently ice and hydrochloric acid is added to obtain a solution which is acid to congo paper, 400 parts of hydrochloric acid are added and the aminoazodye is tetrazotized at 0° with 138 parts of sodium nitrite. After the diazotation is complete a solution of 220 parts of resorcin containing 500 parts of $Na_2CO_3$ is added at 0° C. It is stirred for 4–5 hours, the dye is filtered off and dried. It has most probably the formula:

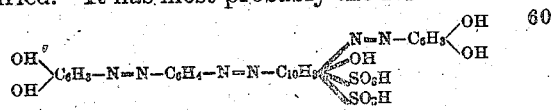

and is a dark powder yielding upon reduction with stannous chlorid and hydrochloric acid meta-phenylenediamin, 1.7-diamino-8-naphthol-3.6-disulfonic acid and aminoresorcin.

150 parts of cotton are dyed for 1 hour in a hot bath (1500–2000 liters) containing 10 parts of Glauber salt, 2 parts of sodium carbonate and 4 parts of the dye obtained from one molecule of meta-aminobenzene-azo-1.8-aminonaphthol-3.6-disulfonic acid and 2 molecules of resorcin. The brown dyed cotton is then rinsed and introduced into a solution of para-nitro-diazobenzene hydrochlorid, made in the usual manner from 1½ parts of para-nitranilin and diluted to from 2000–2500 liters of water and to which shortly before the use ¾ parts of sodium carbonate have been added. After half an hour's treatment the yellowish-bronze dyed cotton thus obtained is washed in a clear cold bath, squeezed and dried.

The dyestuff, containing instead of the 2 molecules of resorcin, one molecule of resorcin and one molecule of meta-phenylenediamin as end components, produces a shade of a more bluish-bronze tint, while the shades of the products, prepared from acidyl-para-phenylenediamin are more olive. Instead of para-nitranilin also other suitable diazo compounds can be used.

I claim:—

1. The herein described new azo dyestuffs which contain an amino-benzene-azo-1-amino-8-naphthol sulfonic acid as middle component and resorcin as at least one of its end components, which dyestuffs yield upon reduction with stannous chlorid and hydrochloric acid a phenylenediamin, a diaminonaphthol sulfonic acid and aminoresorcin and producing after dyeing and developing of the dye on the fiber with suitable diazo compounds valuable olive to brown shades which are very fast to washing and to light and can be discharged to a pure white, substantially as described.

2. The herein described new azo dyestuff having most probably the formula:

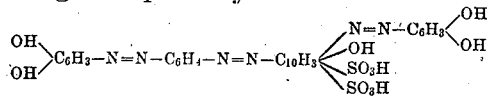

which is after being dried and pulverized a dark powder, yielding upon reduction with stannous chlorid and hydrochloric acid metaphenylenediamin, 1.7-diamino-8-naphthol-3.6-disulfonic acid and aminoresorcin and producing after dyeing and developing of the dye on the fiber with suitable diazo compounds valuable yellowish-bronze shades which are very fast to washing and to light and can be discharged to a pure white, substantially as described.

In testimony whereof I have hereunto set my hand in the presence of two subscribing witnesses.

AUGUST BLANK. [L. S.]

Witnesses:
 ALBERT F. NUFER,
 ALFRED HENKEL.

---

Copies of this patent may be obtained for five cents each, by addressing the "Commissioner of Patents, Washington, D. C."